(12) United States Patent
Bouska et al.

(10) Patent No.: US 11,269,102 B2
(45) Date of Patent: Mar. 8, 2022

(54) SYSTEM AND METHOD FOR SEISMIC SENSOR RESPONSE CORRECTION

(71) Applicant: BP Exploration Operating Company Limited, Middlesex (GB)

(72) Inventors: John Gerard Bouska, Calgary (CA); Amine Ourabah, Guildford (GB); Robin Roy Wye, Weybridge (GB)

(73) Assignee: BP EXPLORATION OPERATING COMPANY LIMITED, Middlesex (GB)

(*) Notice: Subject to any disclaimer, the term of this patent is extended or adjusted under 35 U.S.C. 154(b) by 604 days.

(21) Appl. No.: 16/317,099

(22) PCT Filed: Jul. 6, 2017

(86) PCT No.: PCT/EP2017/067022
§ 371 (c)(1),
(2) Date: Jan. 11, 2019

(87) PCT Pub. No.: WO2018/011064
PCT Pub. Date: Jan. 18, 2018

(65) Prior Publication Data
US 2019/0293819 A1    Sep. 26, 2019

Related U.S. Application Data

(60) Provisional application No. 62/361,020, filed on Jul. 12, 2016.

(51) Int. Cl.
*G01V 1/06* (2006.01)
*G01V 1/36* (2006.01)
(Continued)

(52) U.S. Cl.
CPC .............. *G01V 1/368* (2013.01); *G01V 1/16* (2013.01); *G01V 1/181* (2013.01); *G01V 13/00* (2013.01); *G01V 2210/25* (2013.01)

(58) Field of Classification Search
USPC ........................................................ 367/24
See application file for complete search history.

(56) References Cited

U.S. PATENT DOCUMENTS 5,719,821 A   2/1998   Sallas et al.
6,883,638 B1  4/2005   Maxwell et al.
(Continued)

FOREIGN PATENT DOCUMENTS

| EP | 1464991 A1   | 10/2004 |
| GB | 2042778 A    | 9/1980  |
| WO | 2006076925 A1 | 7/2006 |

OTHER PUBLICATIONS

PCT/EP2017/067022 International Search Report and Written Opinion dated Sep. 27, 2017 (15 p.).

*Primary Examiner* — James R Hulka
(74) *Attorney, Agent, or Firm* — Conley Rose, P.C.

(57) ABSTRACT

A method for processing seismic data includes receiving, by a seismic data processing system, signals representing seismic data recorded at a remote location. In addition, the method includes receiving, by the seismic data processing system, identification of a sensor via which the signals were acquired. Further, the method includes retrieving, by the seismic data processing system, a sensor transfer function that corresponds to the sensor and relates the motion of the sensor to the signals. The method also includes generating, by the seismic data processing system, based on the sensor transfer function and a reference transfer function, an inverse filter that when applied to the signals changes parameters of the signals to correspond to the reference transfer function. Moreover, the method includes applying, by the seismic data processing system, the inverse filter to the signals to conform the parameters of the signals to the reference transfer function.

19 Claims, 5 Drawing Sheets

(51) Int. Cl.
    *G01V 1/18*     (2006.01)
    *G01V 13/00*     (2006.01)
    *G01V 1/16*     (2006.01)

(56) References Cited

U.S. PATENT DOCUMENTS

| | | | |
|---|---|---|---|
| 6,945,110 B2 | 9/2005 | Selvakumar et al. | |
| 7,225,662 B2 | 6/2007 | Kamata | |
| 7,274,079 B2 | 9/2007 | Selvakumar et al. | |
| 7,466,625 B2 * | 12/2008 | Robertsson | G01V 1/201 367/24 |
| 7,499,374 B2 | 3/2009 | Ferber | |
| 8,077,541 B2 | 12/2011 | Ronnow | |
| 8,301,384 B2 | 10/2012 | Forgang et al. | |
| 8,520,467 B2 | 8/2013 | Liu et al. | |
| 9,010,170 B2 | 4/2015 | Paulson et al. | |
| 2005/0000082 A1 * | 1/2005 | Selvakumar | G01P 15/08 29/595 |
| 2005/0277219 A1 * | 12/2005 | Selvakumar | G01V 1/104 438/50 |
| 2006/0042352 A1 | 3/2006 | Kamata | |
| 2007/0179713 A1 | 8/2007 | Scott | |
| 2007/0242563 A1 | 10/2007 | Kamata | |
| 2007/0297287 A1 | 12/2007 | Robertsson et al. | |
| 2008/0144438 A1 * | 6/2008 | Ferber | G01V 1/20 367/56 |
| 2008/0316859 A1 * | 12/2008 | Welker | G01V 1/3826 367/17 |
| 2009/0103394 A1 * | 4/2009 | Ronnow | G01V 13/00 367/13 |
| 2010/0116054 A1 * | 5/2010 | Paulson | G01P 15/131 73/514.32 |
| 2011/0035153 A1 * | 2/2011 | Forgang | G01V 3/24 702/11 |
| 2011/0222371 A1 | 9/2011 | Liu et al. | |
| 2011/0242933 A1 | 10/2011 | Maissant et al. | |
| 2012/0036931 A1 * | 2/2012 | Paulson | G01P 15/131 73/514.32 |
| 2014/0040324 A1 | 2/2014 | Marcolino et al. | |
| 2016/0091361 A1 | 3/2016 | Crocker et al. | |

* cited by examiner

FIG. 4
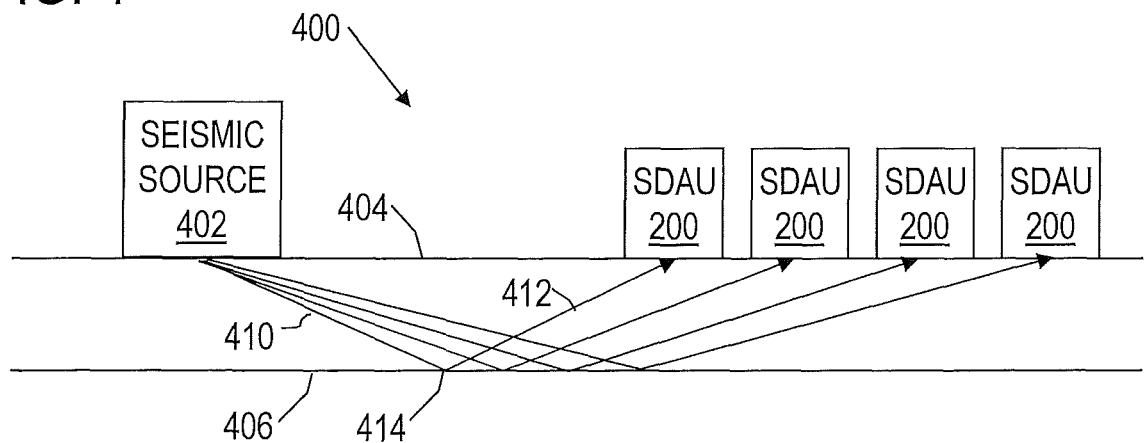
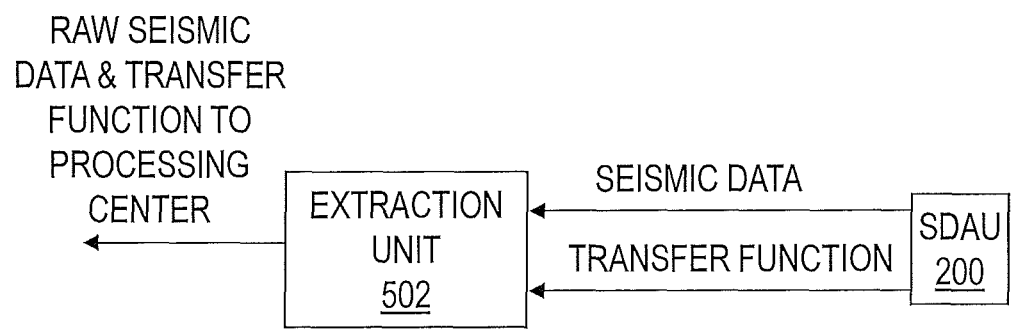
FIG. 5

SYSTEM AND METHOD FOR SEISMIC SENSOR RESPONSE CORRECTION

CROSS-REFERENCE TO RELATED APPLICATIONS

This application is a 35 U.S.C. § 371 national stage application of PCT/EP2017/067022 filed Jul. 6, 2017 and entitled "System and Method for Seismic Sensor Response Correction," which claims priority to U.S. Provisional Application No. 62/361,020 filed Jul. 12, 2016 and entitled "System and Method for Seismic Sensor Response Correction," both of which are hereby incorporated herein by reference in their entirety for all purposes.

STATEMENT REGARDING FEDERALLY SPONSORED RESEARCH OR DEVELOPMENT

Not applicable.

BACKGROUND

Seismic surveys are conducted to map subsurface features. For example, seismic surveys can help locate oil and gas reservoirs. Land based seismic surveys may include hundreds or thousands of individual seismic sensors placed in or on the ground in a grid pattern over an area covering many square kilometers. An explosive charge, seismic vibrator or other suitable source of acoustic energy generates sound waves that propagate through subsurface features. The sound waves are reflected back toward the surface and sensed by the seismic sensors in the grid. Signals from the sensors are collected and used to map the subsurface features in the survey area.

BRIEF DESCRIPTION OF THE DRAWINGS

For a detailed description of exemplary embodiments, reference will now be made to the accompanying drawings, in which:

FIG. 4 shows a block diagram of a seismic data acquisition system that includes seismic data acquisition units suitable for use in seismic sensor response correction in accordance with principles disclosed herein;

FIG. 5 shows a block diagram of extraction of raw seismic data and sensor transfer function from a seismic data acquisition unit for use in seismic sensor response correction in accordance with principles disclosed herein;

NOTATION AND NOMENCLATURE

Figure 1:
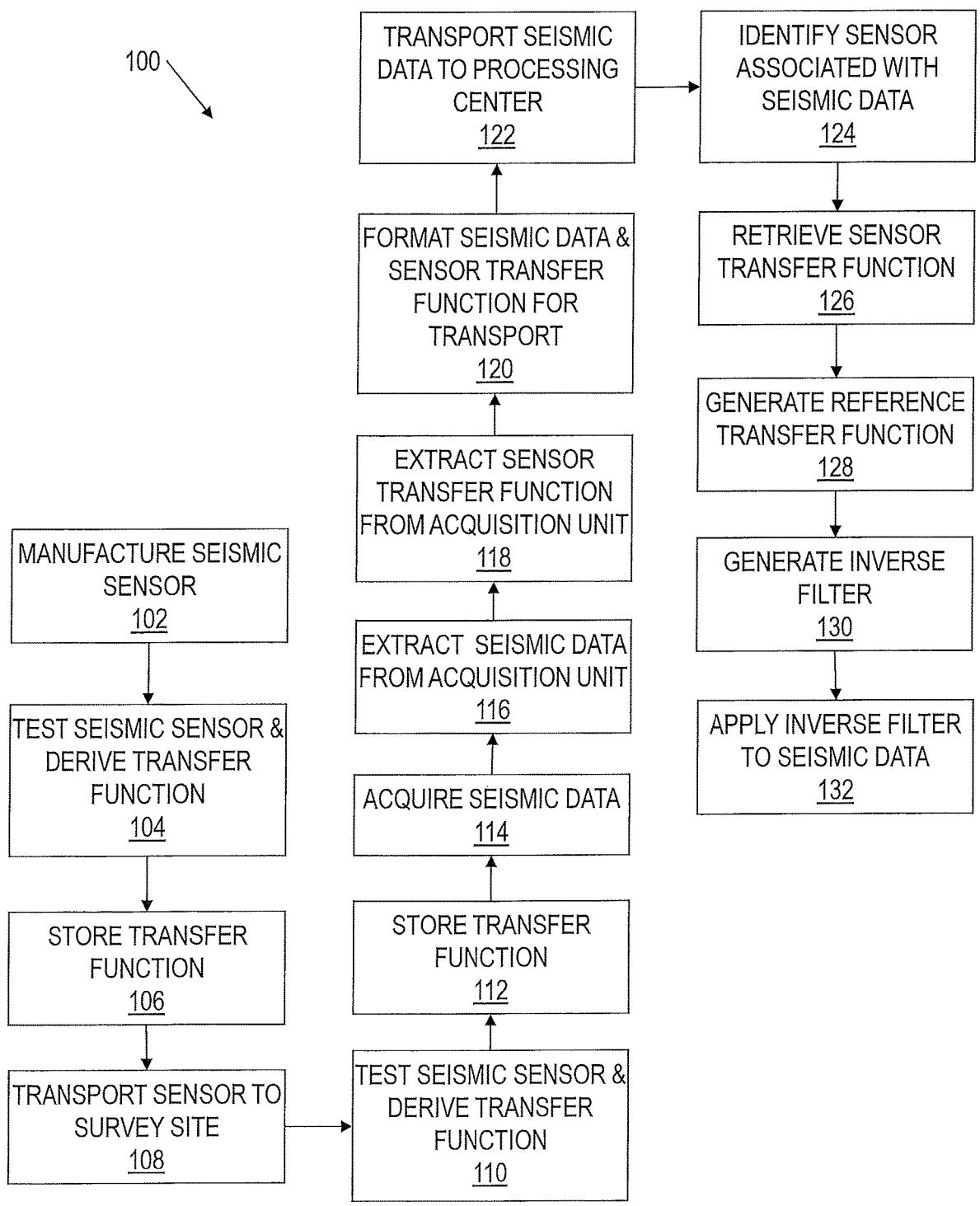
FIG. 1 shows a flow diagram for a method for seismic sensor response correction in accordance with principles disclosed herein.

In the following discussion and in the claims, the terms "including" and "comprising" are used in an open-ended fashion, and thus should be interpreted to mean "including, but not limited to . . . ". The term "couple" is not meant to limit the interaction between elements to direct interaction between the elements and may also include indirect interaction between the elements described. The term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of additional factors.

DETAILED DESCRIPTION

The sensors applied to detect seismic energy (i.e., seismic sensors) may be based on any of a variety of sensing technologies. For example, pressure transducers such as piezoelectric crystals, velocity transducers such as geophones, and acceleration transducers such as accelerometers may be employed in a seismic data acquisition system to detect seismic energy.

Historically, land seismic data has predominately been acquired using geophones. A geophone includes a wire coil disposed in a magnetic field, and may be constructed as either moving magnet or moving coil types, with the moving coil favored for seismic exploration. In the moving coil geophone, the magnet is fixed to the case, which is then firmly planted in the earth, such that the case and magnet move in unison with ground displacements. The moving electrical coil is disposed in the magnetic field gap of the magnet and the coil is loosely coupled to the geophone case by soft springs in such a way that the coil can only travel along a single axis. As the coil moves along this axis, relative to the fixed magnet, the coil will progressively cut through lines of magnetic flux, and generate a voltage and current at electrical terminals of the coil, in proportion to the velocity of ground displacement. In the moving coil geophone, the coil forms the proof or reaction mass.

The coil and spring arrangement will have a resonant frequency dependent on the mass of the coil and the compliance of the springs. At frequencies well below resonance, the coil and magnet move in unison so that sensitivity is low and voltage or current output is small. As the frequency of vibrations increase upwards to and beyond the resonant frequency of the geophone, the sensitivity and output increase, peak and flatten respectively. Typically the resonant frequency of geophones falls in the 10 to 30 Hz range, with preference given to the lower frequencies. Low frequency resonance requires high spring compliance. This subsequently requires soft springs which in turn mandate precise design and construction of the sensor to achieve the required sensitivity, robustness, linearity and immunity to off axis distortion, necessary for seismic acquisition. The design tradeoffs among field strength, magnet size/weight, coil geometry and spring compliance are critical to design and construction of a geophone that has sufficient sensitivity, voltage-current output, linearity and robustness to simultaneously measure both large and small surface vibrations.

Another type of sensor used for seismic surveying uses capacitance to generate the electrical signal. These sensors are typically constructed as Microelectromechanical systems (MEMS) using micro machined silicon with metal plating applied to facing components on either side of a small plated and spring loaded proof mass. MEMS sensors may have the advantage of small size and weight compared to a moving coil geophone. The movement of the MEMS proof mass relative to the outer fixed plates creates variable capacitance which can be detected as a vibration signal proportional to the acceleration of the sensor displacement. The springs are formed from regions of thin cut silicon, allowing a small linear displacement, and resonant frequencies above 1 kHz. The small capacitive surface area, high resonant frequency and restricted limit of linear travel mean that sensitivity will be quite low compared to a moving coil geophone. To counter this low sensitivity, specialized electronics are used to hold the MEMS geophone in force feedback state. This additional electronic circuitry requires space and power and partially defeats the MEMS advantages of size and weight compared to the passive moving coil geophone.

The geophone and the MEMS accelerometer convert ground particle displacement, caused by propagating seismic waves, into a proportional voltage signal that can be recorded as a function of time. The ground particle displacement causes the geophone or MEMS body which is fixed to the ground, to move in unison with the amplitude of the propagating seismic wave at that position in space. The inertia of either the geophone coil or the MEMS silicon proof mass causes it to remain relatively static, such that the body then moves in relation to the coil or proof mass. This relative movement of the body and coil or proof mass is converted to a proportional voltage waveform, enabling the seismic wave to be recorded. To enable effective operation of the device, the sensitivity must be adequate to respond to minute ground movement with low distortion. This requires a strong, heavy magnet and expensively wound coil in geophone sensors or alternately expensive precision micromachined componentry and power consuming electronics in MEMS accelerometers. Expensive sensing elements provide good data quality, but unfortunately drive up the overall cost of seismic data acquisition.

Seismic sensors that use piezoelectric elements for land seismic data acquisition have been proposed to reduce cost and weight of seismic data acquisition hardware. While piezoelectric pressure transducers are widely used in offshore marine surveys, sensors based on piezoelectric elements for onshore use have generally been deemed unsuitable in the art because the accuracy of piezoelectric elements is considered to be insufficient.

Embodiments of the systems and methods disclosed herein reduce the overall cost of seismic acquisition by allowing for a reduction in the cost of seismic data acquisition hardware. As noted above, conventional seismic sensors are designed and tested to maintain high accuracy and consistent performance, and as a result, are relatively expensive components that contribute significantly to the overall cost of seismic data acquisition. Embodiments of the present disclosure allow less expensive sensors to be applied to seismic data acquisition, thereby reducing overall cost. The performance of seismic sensors employed with the systems and methods disclosed herein may be less accurate and/or consistent than that of conventional seismic sensors. Accordingly, the seismic sensors employed with the systems and methods disclosed may be less expensive than conventional seismic sensor because the sensor design parameters and/or testing may be less stringent. Embodiments compensate for the less accurate/consistent seismic sensors by individually correcting the seismic data acquired via each sensor using an inverse filter that is unique to the sensor, thereby compensating for differences in performance across the many seismic sensors applied in a seismic survey.

FIG. 1 shows a flow diagram for a method 100 for seismic sensor response correction in accordance with principles disclosed herein. Though depicted sequentially as a matter of convenience, at least some of the actions shown can be performed in a different order and/or performed in parallel. Additionally, some embodiments may perform only some of the actions shown. In some embodiments, at least some of the operations of the method 100, as well as other operations described herein, can be implemented as instructions stored in a computer readable medium and executed by one or more processors.

In block 102, a seismic sensor is manufactured. The seismic sensor may be a geophone, a MEMS accelerometer, a piezoelectric sensor, or any other type of sensor suitable for use in acquiring seismic data. The performance specifications of the seismic sensor may be relatively loose in comparison to conventional seismic sensors. For example, sensor to sensor frequency, amplitude, and/or phase response may be less consistent that in conventional sensors. In some embodiments, the seismic sensor may be incorporated in a seismic data acquisition unit that includes the seismic sensor and electronics to condition and/or store the seismic signals detected by the seismic sensor. In other embodiments, the seismic sensor may not be incorporated within a seismic data acquisition unit but may be coupleable to a separate seismic data acquisition unit.

In block 104, the seismic sensor is tested and the transfer function of the seismic sensor is derived from results of the testing. For example, the seismic sensor may be affixed to a vibration or impulse generation device, such as a shake table, that is arranged to move the seismic sensor according to a predetermined wave shape. The wave shape may be selected to impart motion to the seismic sensor such that the signals generated by the seismic sensor responsive to the motion can be used to determine the response of the seismic sensor across a range of frequencies. Accordingly, the wave shape may include a sweep of frequencies across a predetermined frequency range (e.g., 10-200 hertz), a chirp including frequencies within the predetermined, an impulse, or an any other wave shape that allows the response of the seismic sensor across a range of frequencies to be determined from the sensors response to the motion corresponding to the wave shape. The response (e.g., amplitude and/or phase response) of the seismic sensor across frequency is referred to herein as the "transfer function" of the seismic sensor. That is, the transfer function of the seismic sensor specifies a relationship of motion of the seismic sensor to signals generated by the seismic sensor responsive to the motion. The signals generated by the seismic sensor responsive to motion of the vibration generation device are time domain signals, and derivation of the transfer function of the seismic sensor may include conversion of the time domain signals into frequency domain signals that specify the amplitude and/or phase of signals generated by the seismic sensors at each frequency across a frequency range of interest.

In some embodiments, testing of the seismic sensor may also include detecting the motion of the vibration or impulse generation device via a reference sensor affixed to the vibration or impulse generation device. The reference sensor may be of known accuracy, and the output of the reference sensor may be deemed to accurately represent the motion of the seismic sensor during testing and provide a baseline for comparison with the signals generated by the seismic sensor.

In block 106, the transfer function of the seismic sensor is stored for access and use in correcting seismic data acquired by the sensor. The transfer function may be stored in a non-volatile memory included in a seismic data acquisition unit that incorporates the seismic sensor. The transfer function may also be stored in a database or secondary storage device accessible to a seismic data processing system that, after use of the seismic sensor in a seismic survey, will process seismic data signals generated by the seismic sensor during the survey.

In block 108, after the seismic sensor has been tested and the transfer function of the sensor recorded, the seismic sensor is transported to the field for use in a seismic survey.

In block 110, the seismic sensor is in the field and available for use in acquiring seismic data. The seismic sensor may be retested in the field to determine whether transfer function of the sensor has changed since manufacturing test. Accordingly, a staging site at which seismic sensors are processed (e.g., repaired, tested, etc.) for use in the seismic survey may include a vibration or impulse generation device suitable for testing the seismic sensor as generally described with respect to block 104. For example, a rack or fixture that houses or supports a number of seismic data acquisition units (each including a seismic sensor) may include a vibration or impulse generation device suitable for testing of the seismic sensor. In some embodiments, each seismic data acquisition unit may include circuitry that allows the seismic sensor to be tested by imparting motion to the sensor from an external source. For example, test circuitry in the seismic data acquisition unit may generate an electrical signal (e.g., sweep, impulse, step function, etc.) that drives the seismic sensor (e.g., the coil of a geophone) and the motion of the sensor responsive to the signal recorded and processed to determine the transfer function of the seismic sensor.

In block 112, the transfer function of the seismic sensor determined in the field may be stored for future reference. For example, the transfer function may be stored in a non-volatile memory included in a seismic data acquisition unit that incorporates the seismic sensor in addition to or in lieu of the transfer function of the seismic sensor derived during manufacturing test. The transfer function may also be stored in a database or secondary storage device accessible to a seismic data processing system that, after use of the seismic sensor in the seismic survey, will process seismic data signals generated by the seismic sensor during the survey.

In some embodiments, the transfer function derived in the field may be compared to the transfer function derived during manufacturing test. If the comparison indicates that the transfer function has changed by more than a predetermined amount, then the seismic sensor may be flagged for further testing or repair.

In block 114, the seismic sensor is deployed to acquire seismic data. The seismic sensor detects ground motion and generates signals representative of the detected ground motion (i.e., generates seismic data/seismic signals). The seismic data acquisition unit associated with the seismic sensor conditions and stores the seismic data (i.e., raw seismic data). In some embodiments, the seismic data acquisition unit may transmit the seismic data to another component of the data acquisition system for further processing and/or storage. In some embodiments, the seismic data acquisition unit stores the seismic data in internal memory for retrieval at a later time (e.g., after the seismic data acquisition unit is removed from service).

In block 116, the seismic data acquired in block 114 and stored in the seismic data acquisition unit is extracted, read, or received from the seismic data acquisition unit. The extraction may be performed, via a wired or wireless communication link with the seismic data acquisition unit, after the seismic data acquisition unit has been moved from the acquisition location to the staging site, or while the seismic data acquisition unit is at the acquisition location.

In block 118, if the transfer function of the seismic sensor is stored in the seismic data acquisition unit, then the transfer function is extracted, read, or received from the seismic data acquisition unit. The transfer function may include a transfer function stored in the seismic data acquisition unit at manufacturing test and/or a transfer function stored in the seismic data acquisition unit in response to a test performed in the field.

In some embodiments, additional data may be extracted, read, or received from the seismic data acquisition unit in block 118. For example, in some embodiments a reference transfer function stored in the seismic data acquisition unit may be extracted from the seismic data acquisition unit in block 118. The reference transfer function may be a representation of the transfer function of an ideal seismic sensor, a representation of the transfer function of a representative seismic sensor, or other transfer function to which seismic data extracted from the seismic data acquisition unit is to be conformed in processing.

In block 120, the raw seismic data, and optionally the transfer function(s) read from the seismic data acquisition unit are formatted for transport or provision to a seismic data processing center. For example, an identifier of a seismic sensor that produced a raw seismic trace and a transfer function of the seismic sensor may be recorded as header data associated with the raw seismic trace. The identifier of a seismic sensor may include a serial number, model number, manufacturer identification, and/or other information that uniquely identifies the seismic sensor.

In block 122, the formatted raw seismic data is transported to a seismic data processing center for application of seismic data processing algorithms. The raw data may be recorded on magnetic tapes, optical media, or other media for physical transport to the processing center. Alternatively, the raw seismic data may be transported to the seismic data processing center via transmission over a public and/or private wired and/or wireless network. The seismic data processing center may be provided at a different location from the location at which the seismic survey is performed. For example, the seismic data processing center may be many kilometers distant from the location of the seismic survey and the seismic data acquisition equipment. Thus, the seismic data processing center, and a seismic data processing system of the seismic data processing center that are separate and distant from the seismic data acquisition system and distant from the location of the seismic survey may be termed a "remote seismic data processing center" and a "remote seismic data processing system."

In block 124, the raw seismic data generated by the seismic sensor in a seismic survey is accessed and manipulated by a seismic data processing system. For each raw seismic data trace, the seismic data processing system identifies the seismic sensor that generated the trace. In some embodiments, the seismic data processing system may parse the header associated with the raw seismic trace to extract sensor identification. Alternatively, information relating raw seismic data to the seismic sensor that generated the data may be provided to the processing center in a different form, such as a table containing information that relates sensor identification to seismic trace identification.

In block 126, the seismic data processing system, having identified the particular seismic sensor that generated the raw seismic data trace being processed, retrieves the transfer function of the seismic sensor. The seismic data processing system may access a database or other secondary storage system that contains the transfer functions of any number of different seismic sensors arranged for access based on the seismic sensor identification information. In some embodiments, the seismic data processing system may extract the transfer function from the header associated with the raw seismic trace, or from another data structure provided with the raw seismic data that associates transfer function and seismic sensor.

In some cases, multiple transfer functions for a seismic sensor may be available. For example, a transfer function generated in manufacturing test and a transfer function generated at part of a field test may be available. The seismic data processing system may select one or more of the transfer functions for use in processing of the raw seismic data. For example, the seismic data processing system may select a latest generated one of the transfer functions, or may select any one of the transfer functions deemed most accurate.

In block 128, the seismic data processing system generates a reference transfer function for the seismic sensor. The reference transfer function may be an ideal transfer function for the seismic sensor provided the manufacturer of the seismic sensor. For example, an ideal transfer function may be derived from the motion of the vibration or impulse generation device used to test the seismic sensor as detected by a motion transducer of known accuracy during testing of the seismic sensor. In some embodiments, reference transfer function may be computed as an average transfer function of a number of seismic sensors. For example, the manufacturer of the seismic sensor may generate the reference transfer function as an average of the transfer functions of a large number of sensors (e.g., all sensor produced within a particular time interval) produced by the manufacturer.

In some embodiments, the seismic data processing system may produce the reference transfer function based on the transfer functions of seismic sensors used in the seismic survey that generated the raw seismic trace. For example, the reference transfer function may be generated as an average of transfer functions of seismic sensors used in the seismic survey within a predetermined geographic proximity of the seismic sensor that produced the raw seismic trace. Alternatively, the seismic data processing system may produce the reference transfer function based on another selected set of seismic sensors. For example, the seismic data processing system may produce the reference transfer function as an average of transfer functions of all the seismic sensors used in the seismic survey that produced the raw seismic trace.

In block 130, the seismic data processing system generates an inverse filter to be applied to the raw seismic trace. The inverse filter is based on the transfer function of the seismic sensor that produced the raw seismic trace and the reference transfer function. The inverse filter is configured to conform the transfer function of the seismic sensor to the reference transfer function. When applied to the raw seismic trace, the inverse filter adjusts the spectral parameters of the raw seismic trace such that the spectral parameters of the inverse filtered seismic trace substantially conform to the reference transfer function.

In block 132, the seismic data processing system applies the inverse filter to the raw seismic trace to conform the spectral parameters of the raw seismic trace to the reference transfer function. Application of the inverse filter may include convolution of the raw seismic trace and the inverse filter. The seismic data processing system may process each raw seismic trace as described above with respect to blocks 124-132 to produce seismic data traces that conform to a desired seismic sensor transfer function, while the actual transfer functions of the seismic sensors may differ substantially. After the raw seismic traces have been adjusted to correct for variations in sensor response, the seismic data processing system may apply additional processing to the seismic traces to produce an image of the subsurface corresponding to the seismic survey. For example, automatic gain control, muting, filtering, moveout correction, velocity analysis, stacking, migration, and other processing may be applied to convert the inverse filtered seismic data to an image of the subsurface.

Figure 2:
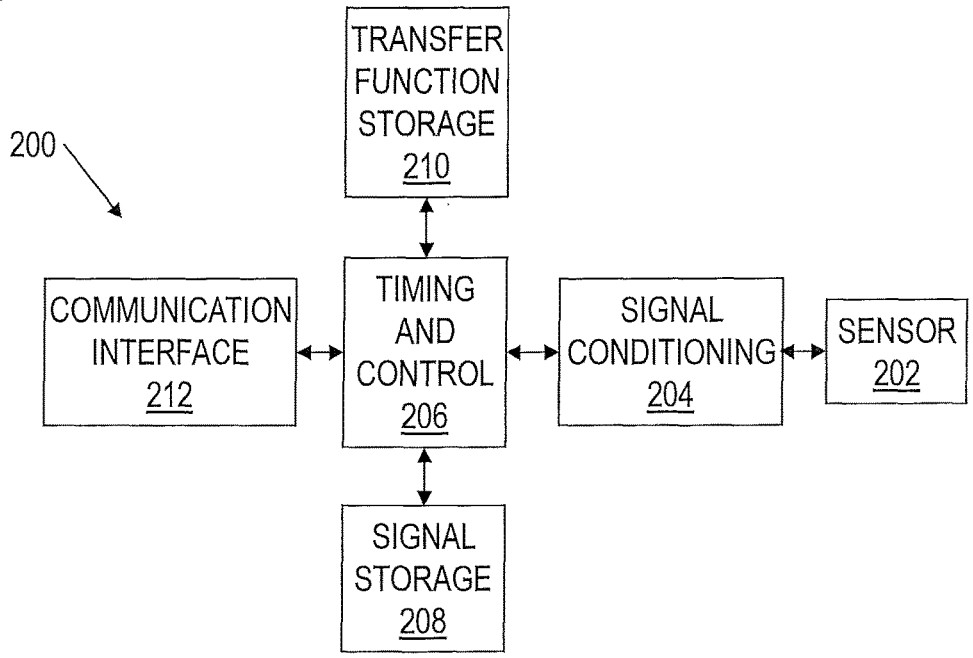
FIG. 2 shows a block diagram of a seismic data acquisition unit suitable for use in seismic sensor response correction in accordance with principles disclosed herein.

FIG. 2 shows a block diagram of a seismic data acquisition unit 200 suitable for use in seismic sensor response correction in accordance with principles disclosed herein. The seismic data acquisition unit 200 includes a seismic sensor 202, signal conditioning circuitry 204, timing and control circuitry 206, signal storage 208, transfer function storage 210, and a communication interface 212. The seismic data acquisition unit 200 may include additional components that have been omitted from FIG. 2 in the interest of clarity. For example, the seismic data acquisition unit 200 may include batteries, power supply circuitry, etc.

The seismic sensor 202 may be a geophone, an accelerometer, a piezoelectric sensor or other sensor suitable for use in seismic data acquisition (e.g., any sensor that can detect ground movement). In some embodiments of the seismic data acquisition unit 200, the seismic sensor 202 may be internally contained within a same housing as the signal conditioning circuitry 204, timing and control circuitry 206, signal storage 208, and other components of the seismic data acquisition unit 200. Alternatively, the seismic sensor 202 may be external to the seismic data acquisition unit 200 and coupled to the seismic data acquisition unit 200 via a communication interface (e.g., an electrical or other communication connection provided via a connector or port of the seismic data acquisition unit 200).

The signal conditioning circuitry 204 may include an amplifier, filter, analog-to-digital converter, or other circuitry that conditions output of the seismic sensor 202. In some embodiments, the signal conditioning circuitry 204 may include test circuitry for driving a test signal to the seismic sensor 202. Such test circuitry may include an impulse generator, an oscillator, a sweep generator, etc. for producing signals used to drive the seismic sensor 202 as needed to ascertain the transfer function of the seismic sensor.

The timing and control circuitry 206 includes timing circuitry that controls timing of operations performed by the seismic data acquisition unit 200. For example, the timing and control circuitry 206 may include circuitry that controls the timing of sampling and digitization of signals output by the seismic sensor 202. Control functions may be performed by a dedicated control circuit, such as a state machine, or by a microcontroller or other programmable control element that executes instructions. Control functions may include setting parameters of the signal conditioning circuitry 204, controlling access to the storage 208, 210, and controlling communication with external devices via the communication interface 212.

The signal storage 208 may include volatile and/or non-volatile memory devices that store seismic data output by the seismic sensor 202. For example, FLASH memory or other non-volatile memory may store acquired seismic data until the seismic data is extracted, e.g., after the seismic data acquisition unit 200 has been removed from service and transported to a staging location for charging and/or other service.

The transfer function storage 210 may include a non-volatile memory device that stores one or more transfer functions of the seismic sensor 202. For example, FLASH memory or other non-volatile memory may store transfer functions of the seismic sensor 202 generated at sensor manufacture or in the field. A transfer function may be read from the transfer function storage in conjunction with extraction of seismic data from the signal storage 208. The signal storage 208 and the transfer function storage 210 may reside in a same memory device or different memory devices. For example, in some embodiments, a first portion of a given memory device may be allocated for use as the signal storage 208, and a second portion of the given memory device may be allocated for use as the transfer function storage 210.

The communication interface 212 allows the seismic data acquisition unit 200 to communicate with other devices via a conductive or wireless medium. For example, the communication interface may include an electrical connector for communicatively coupling the seismic data acquisition unit 200 to a wired communication network or another device, or may include an antenna or an optical communication device for communicatively coupling the seismic data acquisition unit 200 to a wireless network. The communication interface 212 may also include a transceiver for transmitting and receiving communications, a modulator, a demodulator, an encoder, a decoder, and other circuitry that facilitates communication between the seismic data acquisition unit 200 and other devices. Via the communication interface 212, the seismic data acquisition unit 200 may upload seismic data stored in the signal storage 208, upload a transfer function stored in the transfer function storage 210, download a transfer function to be stored in the transfer function storage 210, download commands and parameters used to control and configure the seismic data acquisition unit 200, and/or upload status information generated by the seismic data acquisition unit 200.

Figure 3:
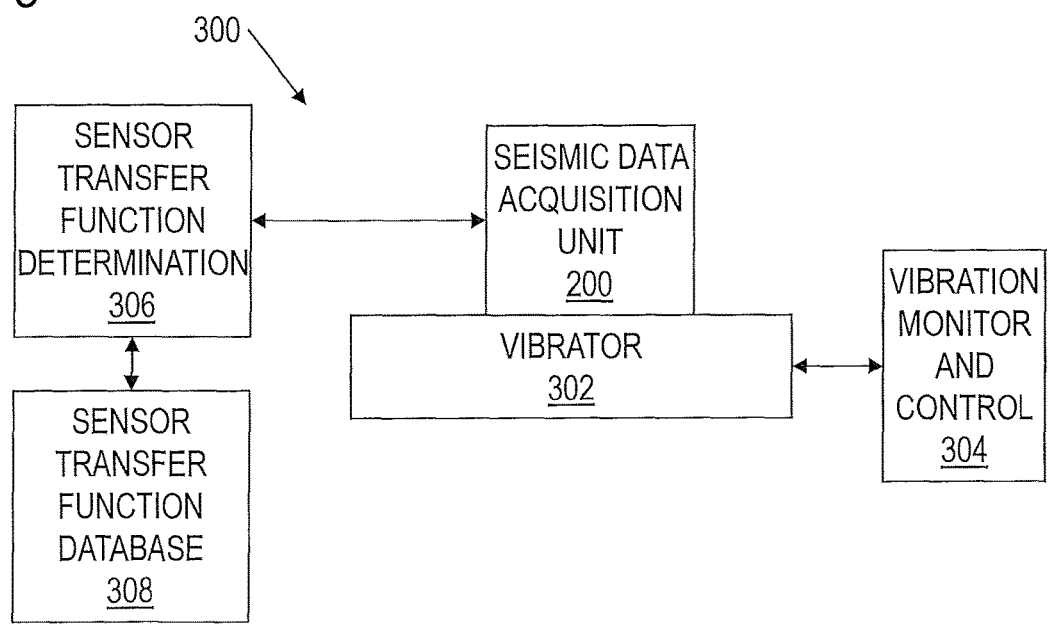
FIG. 3 shows a block diagram of apparatus suitable for testing a seismic sensor for determination of a transfer function of the seismic sensor in accordance with principles disclosed herein.

FIG. 3 shows a block diagram of apparatus 300 suitable for testing a seismic sensor 202 for determination of a transfer function of the seismic sensor 202 in accordance with principles disclosed herein. The apparatus 300 may be used to test the sensor 202 and derive a transfer function of the seismic sensor 202 as described in block 104 of FIG. 1. The apparatus 300 includes a vibrator 302, vibration monitor and control circuitry 304, sensor transfer function determination logic 306, and a sensor transfer function database 308. The vibrator 302 may be a shake table or other apparatus that provides controllable motion. A seismic sensor 202 may be affixed to the vibrator 302. In FIG. 3, the seismic sensor 202 is contained within the seismic data acquisition unit 200. Accordingly, the seismic data acquisition unit 200 is affixed to the vibrator 302. Under such test conditions, the transfer function derived from testing may include effects produced by parameters or circuitry of the seismic data acquisition unit 200 (e.g., mechanical damping, effects of the signal conditioning circuitry 204, etc.).

The vibration monitor and control circuitry 304 includes circuitry that drives motion of the vibrator 302 based on a predetermined waveform (e.g., an impulse or frequency sweep) to be applied to the seismic sensor 202. The vibration monitor and control circuitry 304 may also include circuitry that monitors and records the motion of the vibrator to a known accuracy. For example, the vibration monitor and control circuitry 304 may include an accelerometer of known accuracy mounted to the vibrator 302 and include circuitry to process and store the output of the accelerometer.

The sensor transfer function determination logic 306 receives the signals representative of vibrator motion produced by the seismic sensor 202, and processes the signals to determine a transfer function of the seismic sensor 202. The sensor transfer function determination logic 306 may transmit the transfer function to the seismic data acquisition unit 200 for storage in the transfer function storage 210, and may transmit the transfer function to the sensor transfer function database 308 for storage.

The sensor transfer function database 308 receives the transfer function and identification of the seismic sensor 202 and/or the seismic data acquisition unit 200 from the sensor transfer function determination logic 306, and stores the transfer function for retrieval based on the identification of the seismic sensor 202 and/or the seismic data acquisition unit 200. The sensor transfer function database 308 may include a relational database, an object oriented database, or other storage structure that allows data access and retrieval. The sensor transfer function database 308 may be accessed by a seismic data processing system to retrieve the transfer function of the seismic sensor 202.

The sensor transfer function determination logic 306 and the sensor transfer function database 308 may be embodied in a computer that executes instructions for deriving the transfer function from the data received from the seismic data acquisition unit 200, and for storing and providing access to the transfer function based on the identification of the seismic sensor 202 and/or identification of the seismic data acquisition unit 200.

FIG. 4 shows a block diagram of a seismic data acquisition system 400 that includes seismic data acquisition units 200 suitable for use in seismic sensor response correction in accordance with principles disclosed herein. To promote clarity, in FIG. 4, only a single subsurface interface 406 is shown. In practice, any number of subsurface interfaces may be present. Impedance changes may be caused by changes in rock type that result in a change in acoustic impedance.

A seismic source 402 is located on the surface 404 of the earth. The seismic source 402 creates controlled seismic waves for propagation through the subsurface. Examples of seismic sources include explosives, vibroseis trucks, and weight drop systems also known as thumper trucks. For example, a thumper truck may strike the surface 404 of the earth with a weight or "hammer" creating a shock that propagates through the subsurface as seismic waves 410. The seismic waves propagate downward through the subsurface from the seismic source 402. The seismic waves are then reflected, at least partially, from the interface 406. The reflection is caused by the density and/or elastic velocity differential between the materials above and below the interface 406. The reflected seismic waves 412 then propagate upwards from the interface 406 to the surface 404. At the surface 404, the reflected seismic waves 412 are detected by seismic sensors 202 associated with the seismic data acquisition units 200. The data acquisition units 200 store, in signal storage 208, and/or transmit to a separate storage device, data indicative of the detected seismic wave. This data can then be corrected based on the transfer function of the seismic sensor 202 to determine the composition and structure of the subsurface.

It will be appreciated that the above is only an example, and more complex subsurface compositions may be present in the subsurface. Consequently, the reflection pattern of waves may be substantially more complex than that illustrated. For example, a part of a downward propagating seismic wave 410 may not be reflected by the interface 406, and instead travel through the interface 406. This wave my subsequently be reflected off a lower interface, meaning that multiple reflections may be received by any given seismic sensor.

The above described principle is not limited to surface based seismic sensing, and may be applied to marine seismic surveying. In this case, the interface 406 is covered by a layer of water. The seismic data acquisition units 200 may be provided on the seabed, or alternatively on or within the water. Alternative seismic sources 402 may be provided for marine seismic surveying, such as air guns and plasma sound sources.

FIG. 5 shows a block diagram of extraction of raw seismic data and sensor transfer function from a seismic data acquisition unit 200 for use in seismic sensor response correction in accordance with principles disclosed herein. In FIG. 5, an extraction unit 502 is communicatively coupled to the seismic data acquisition unit 200 (e.g., via the communication interface 212). The extraction unit 502 may be disposed at a staging site that is proximate the site of a seismic survey applying the seismic data acquisition unit 200. After seismic data has been acquired using the seismic data acquisition unit 200, as described in FIG. 4, the seismic data acquisition unit 200 may be transported to the staging site and communicatively coupled to the extraction unit 502. The extraction unit 502 retrieves raw seismic data and a sensor transfer function from the seismic data acquisition unit 200 via communication over a wired and/or wireless communication link. The extraction unit 502 may format the raw seismic data for use by a seismic data processing system. For example, the extraction unit 502 may append a header to each raw seismic data trace. The header may include, for example, geographical location of the sensor 202 and the source 402 during trace acquisition, sensor 202 and/or seismic data acquisition unit 200 identification, sensor 202 transfer function, and other information needed to process the raw seismic data trace.

The extraction unit 502 may be embodied in a computer that executes instructions for retrieving the raw seismic data and a sensor transfer function from the seismic data acquisition unit 200 and for formatting the raw seismic data and a sensor transfer function for use by a seismic data processing system.

Figure 6:
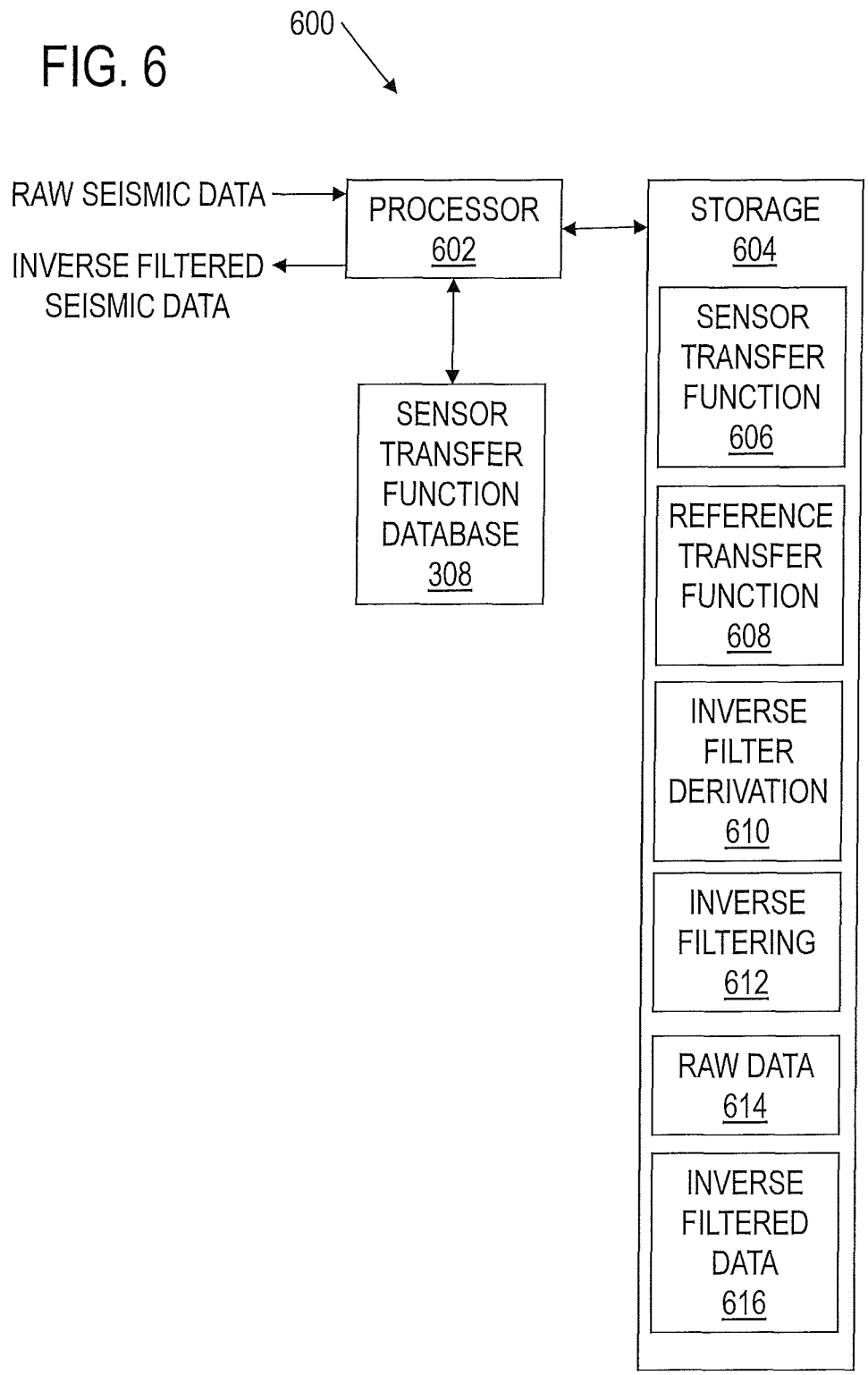
FIG. 6 shows a block diagram of a processing system suitable for correction of seismic sensor response in accordance with principles disclosed herein.

FIG. 6 shows a block diagram of a seismic data processing system 600 suitable for correction of seismic sensor response in accordance with principles disclosed herein. The processing system 600 includes a processor 602, storage 604, and a sensor transfer function database 308. The processor 602 is configured to execute instructions retrieved from storage 604. The processor 602 may include any number of cores or sub-processors. Suitable processors include, for example, general-purpose processors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

Software programming, including instructions executable by the processor 602, is stored in the storage 604. The storage 604 is a non-transitory computer-readable medium. Computer-readable storage media may include volatile storage such as random access memory, non-volatile storage (e.g., ROM, PROM, a hard drive, an optical storage device (e.g., CD or DVD), FLASH storage), or combinations thereof.

The storage 604 includes sensor transfer function determination instructions 606, reference transfer function determination instructions 608, inverse filter derivation instructions 610, and inverse filtering instructions 612. The storage 604 may also include raw seismic data traces 614, and inverse filtered seismic data traces 616, and additional instructions that transform the inverse filtered seismic data traces 616 into an image of the subsurface. The sensor transfer function determination instructions 606 are executed by the processor 602 to retrieve the transfer function of a seismic sensor 202 that produces a raw seismic trace being processed. To retrieve the transfer function, the processor 602 identifies the seismic sensor that generated the raw seismic trace. In some embodiments, the processor 602 may parse a header associated with the raw seismic trace to extract sensor identification. Alternatively, the processor 602 may access information relating raw seismic data to the seismic sensor that generated the data provided to the processor 602 in a different form, such as a table containing information that relates sensor identification to seismic trace identification.

After the particular seismic sensor that generated the raw seismic data trace being processed has been identified, the processor 602 retrieves the transfer function of the seismic sensor. The processor 602 may access the sensor transfer function database 308 or another secondary storage system that contains the transfer functions of any number of different seismic sensors 202 arranged for access based on the seismic sensor identification information. In some embodiments, the processor 602 may extract the transfer function from the header associated with the raw seismic trace, or other data structure provided with the raw seismic data that associates transfer function and seismic sensor 202.

If multiple transfer functions for a seismic sensor 202 are available, then the processor 602 may select one of the transfer functions for use in processing of the raw seismic data. For example, the processor 602 may select a latest generated one of the transfer functions, or a one of the transfer functions deemed most accurate.

The reference transfer function determination instructions 608 are executed by the processor 602 to produce a transfer function to which the raw seismic data is to be conformed via inverse filtering. The reference transfer function may be an ideal transfer function for the seismic sensor provided by the manufacturer of the seismic sensor 202. For example, an ideal transfer function may be derived from the motion of the vibrator 302 used to test the seismic sensor 202 as detected by a motion transducer of known accuracy during testing of the seismic sensor 202. Such a reference transfer function may be stored in the sensor transfer function database 308 or internal storage of the seismic data acquisition unit. Accordingly, the reference transfer function determination instructions 608 may extract the reference transfer function from a header associated with a raw seismic trace, or access the sensor transfer function database 308 to retrieve the reference transfer function.

In some embodiments, a reference transfer function may be computed as an average transfer function of a number of seismic sensors 202. For example, the manufacturer of the seismic sensor 202 may generate the reference transfer function as an average of the transfer functions of a large number of sensors (e.g., all sensors 202 produced within a particular time interval) produced by the manufacturer. Such reference transfer functions (e.g., manufacturer generated) may be stored in and retrieved from the sensor transfer function database 308.

In some embodiments, the processor 602 may produce the reference transfer function based on the transfer functions of seismic sensors 202 used in the seismic survey that generated the raw seismic trace being processed. For example, the reference transfer function may be generated as an average of transfer functions of seismic sensors 202 applied in the seismic survey within a predetermined geographic proximity of the seismic sensor 202 that produced the raw seismic trace. Alternatively, the processor 602 may produce the reference transfer function as an average of transfer functions of all the seismic sensors 202 used in the seismic survey that produced the raw seismic trace. The processor 602 may retrieve the transfer functions of the sensors 202 for averaging from headers or from the sensor transfer function database as described above.

The inverse filter derivation instructions 610 are executed by the processor 602 to produce an inverse filter to be applied to the raw seismic trace to conform the trace to the reference transfer function. The inverse filter is based on the transfer function of the seismic sensor 202 that produced the raw seismic trace and the reference transfer function. When applied to the raw seismic trace, the inverse filter adjusts the spectral parameters of the raw seismic trace such that the spectral parameters of the raw seismic trace substantially conform to the reference transfer function.

Figure 7A:
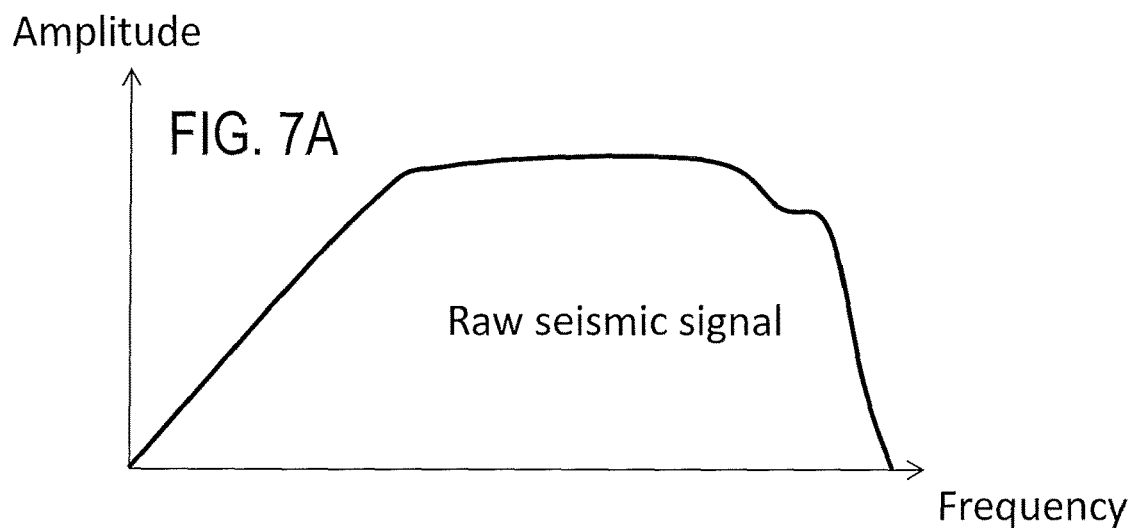
FIGS. 7A-7C respectively show frequency content of an example of raw seismic data, frequency response of an inverse filter applied to correct sensor response, and frequency content of filtered seismic data in accordance with principles disclosed herein.
Figure 7B:
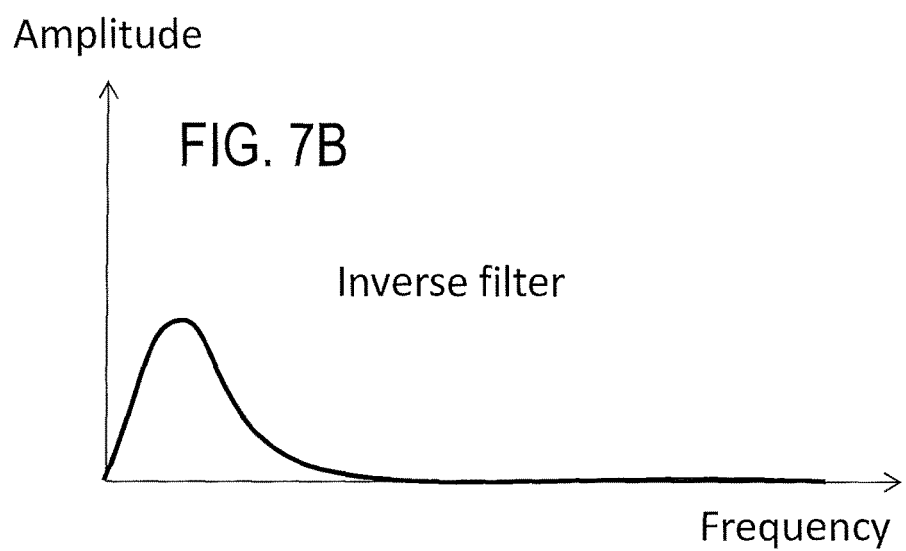
Figure 7C:
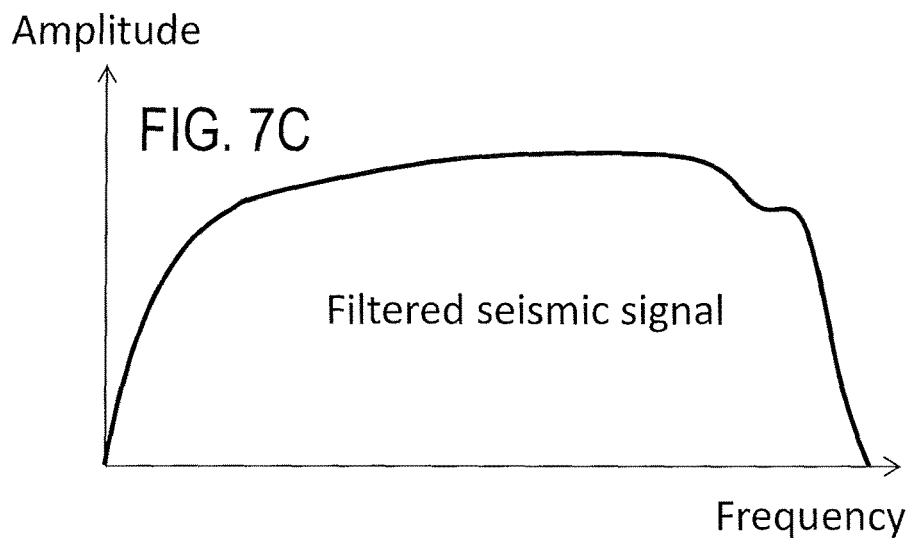

The inverse filtering instructions 612 are executed by the processor 602 to apply the inverse filter to the raw seismic trace to conform the trace to the reference transfer function. FIG. 7A shows frequency content of a raw seismic data trace as produced by seismic sensor 202 having a corresponding transfer function. FIG. 7B shows response of an inverse filter generated to conform the seismic data to a reference transfer function. FIG. 7C shows frequency content of seismic data after application of the inverse filter to the raw seismic data.

In the drawings and description of the present disclosure, like parts are typically marked throughout the specification and drawings with the same reference numerals. The drawing figures are not necessarily to scale. Certain features of the invention may be shown exaggerated in scale or in somewhat schematic form, and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings and components of the embodiments discussed below may be employed separately or in any suitable combination to produce desired results. For example, an embodiment of a system may include the apparatus 300, the seismic data acquisition system 400, the extraction unit 502, and the seismic data processing system 600 or any combination thereof.

The above discussion is meant to be illustrative of various principles and embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

In a first aspect, a system for acquiring and processing seismic data, comprises: a seismic data acquisition unit, comprising:
a data storage memory configured to store a transfer function of a seismic sensor coupled to the seismic data acquisition unit; and
a second memory configured to store signals generated by the seismic sensor;
a data extraction unit configured to:
retrieve, from the seismic data acquisition unit, the signals stored in the data storage memory; and
format the signals for transport to a seismic data processing system;
a sensor tester configured to:
apply a test signal to the seismic sensor, as part of a field test;
record response of the seismic sensor to the test signal;
process the response to generate the transfer function; and
store the transfer function for use by the seismic data processing system in generating an inverse filter that when applied to the signals changes parameters of the signals to correspond to the signals being generated with the seismic sensor having a reference transfer function.

The seismic data processing system may be configured to:
receive the signals formatted by the data extraction unit;
identify the seismic sensor coupled to the seismic data acquisition unit that generated the signals;
retrieve the sensor transfer function that corresponds to the seismic sensor; generate, based on the sensor transfer function and the reference transfer function, the inverse filter; and
apply the inverse filter to the signals.

The seismic data processing system may also/alternatively be configured to generate the reference transfer function as an average of sensor transfer functions of a plurality of seismic sensors.

In any of the above embodiments, the test signal can comprise an impulse or a plurality of frequencies applied to move the seismic sensor.

In any of the above embodiments, the sensor tester may be configured to:
compare the transfer function of the sensor generated as part of a manufacturing test to the transfer function of the sensor generated as part of the field test;
generate an alert signal based on a dissimilarity between the transfer function of the sensor generated as part of the manufacturing test to the transfer function of the sensor generated as part of the field test exceeding a predetermined amount.

The sensor can comprise at least one of a piezoelectric crystal, a geophone, and an accelerometer.

The seismic data acquisition unit can comprise a transfer function memory configured to store the sensor transfer function that corresponds to the seismic sensor.

The data extraction unit may be configured to:
retrieve the transfer function from the transfer function memory; and format the transfer function for transport to the seismic data processing system in conjunction with the signals.

In a first method, there is a method for processing seismic data comprising:
receiving, by a seismic data processing system, signals representing seismic data recorded at a remote location;
receiving, by a seismic data processing system, in conjunction with the signals, identification of a seismic sensor via which the signals were acquired;
retrieving, by a seismic data processing system, a sensor transfer function that corresponds to the seismic sensor and relates the motion of the seismic sensor to the signals;
generating, by a seismic data processing system, based on the sensor transfer function and a reference transfer function, an inverse filter that when applied to the signals changes parameters of the signals to correspond to the reference transfer function;
applying, by a seismic data processing system, the inverse filter to the signals to conform the parameters of the signals to the reference transfer function.

The method may further comprise:
storing the sensor transfer function in a data storage memory of a seismic data acquisition unit coupled to the seismic sensor prior to deployment of the seismic data acquisition unit;
after use of the seismic data acquisition unit to record seismic data:
retrieving the signals stored in a data storage memory of the seismic data acquisition unit; and
formatting the signals for transport to the remote data processing system.

The method may further/alternatively comprise:
applying a test signal to the seismic sensor, as part of a manufacturing test or a field test, wherein the test signal comprises at least one of an impulse or a range of frequencies applied to move the seismic sensor;
recording response of the seismic sensor to the test signal;
processing the response to generate the transfer function; and
storing the transfer function for use by the remote data processing system in generating the inverse filter.

The transfer function of the seismic sensor generated as part of the manufacturing test can be compared to the transfer function of the seismic sensor generated as part of the field test; and
an alert signal can be generated based on a dissimilarity between the transfer function of the seismic sensor generated as part of the manufacturing test to the transfer function of the seismic sensor generated as part of the field test exceeding a predetermined amount.

Any of the above methods may further comprise generating, by the seismic data processing system, the reference transfer function as an average of sensor transfer functions of a plurality of seismic sensors.

Any of the above methods may further comprise:
retrieving, from a transfer function memory of a seismic data acquisition unit, the transfer function; and
formatting the transfer function for transport to the remote data processing system in conjunction with the signals.

In a second method, there is a method for processing seismic data comprising:
as part of manufacturing test of a sensor to be used for acquisition of seismic data:
deriving a sensor transfer function of the seismic sensor;
storing the sensor transfer function for use by a seismic data processing system in generation of an inverse filter;
as part of seismic data acquisition:
acquiring seismic data via the seismic sensor;
extracting the seismic data from a seismic data acquisition unit coupled to the seismic sensor;
formatting the seismic data for transport to the seismic data processing system that is at a different location from the seismic data acquisition unit, the formatting comprising providing identification of the seismic sensor for transport with the seismic data;
as part of processing of the seismic data by the seismic data processing system:
retrieving the sensor transfer function based on the identification of the seismic sensor;
generating, based on the sensor transfer function and a reference transfer function, the inverse filter that when applied to the seismic data changes parameters of the seismic data to correspond to the seismic data being generated with the seismic sensor having the reference transfer function;
applying, by the seismic data processing system, the inverse filter to the seismic data to conform the parameters of the seismic data to the seismic data being generated with the seismic sensor having the reference transfer function.

In the first or second methods, storing the sensor transfer function can comprise storing the sensor transfer function in a data storage memory of the seismic data acquisition unit coupled to the seismic sensor or storing the sensor transfer function in a database accessible to the seismic data processing system.

In embodiments, deriving the sensor transfer function can comprise:
applying a test signal to the seismic sensor, wherein the test signal comprises at least one of an impulse or a range of frequencies applied to move the seismic sensor;
recording response of the seismic sensor to the test signal;
processing the response to generate the transfer function; and
storing the transfer function for use by the seismic data processing system in generating the inverse filter.

In embodiments of the first or second methods, applying the test signal may comprise:
affixing the seismic sensor to a movable structure; and
applying a motion impulse or motion over a range of frequencies to the movable structure.

The embodiments may further comprise:
as part of seismic data acquisition:
retrieving, from a transfer function memory of a seismic data acquisition unit, the transfer function; and
formatting the transfer function for transport to the data processing system in conjunction with the seismic data; or
as part of the seismic data acquisition:
comparing the transfer function of the sensor generated as part of the manufacturing test to the transfer function of the sensor generated as part of a field test;
generating an alert signal based on a dissimilarity between the transfer function of the sensor generated as part of the manufacturing test to the transfer function of the sensor generated as part of the field test exceeding a predetermined amount.

The embodiments may further comprise, as part of processing of the seismic data by the seismic data processing system, generating the reference transfer function as an average of sensor transfer functions of a plurality of movable sensors.

What is claimed is:

1. A system for acquiring and processing seismic data, comprising:
   a seismic data acquisition unit, comprising:
      a data storage memory; and
      a second data storage memory configured to store the signals generated by a seismic sensor coupled to the seismic data acquisition unit;
   a data extraction unit configured to:
      retrieve, from the seismic data acquisition unit, the signals stored in the data storage memory; and
      format the signals for transport to a seismic data processing system, wherein the seismic data processing system is configured to identify the seismic sensor coupled to the seismic data acquisition unit that generated the signals, the seismic sensor is identified from among a plurality of other seismic sensors, and the seismic data processing system is configured to retrieve the sensor transfer function that corresponds to the identified seismic sensor;
   a sensor tester configured to:
      apply, using an impulse generation device, a test signal having a predetermined wave shape to the seismic sensor as part of a field test;
      record a response of the seismic sensor to the test signal based on a motion of the seismic sensor responsive to the test signal;
      determine a sensor transfer function of the seismic sensor, wherein the sensor transfer function indicates the response of the seismic sensor to the test signal having the predetermined wave shape; and
      store, in the data storage memory of the seismic data acquisition unit, the sensor transfer function, wherein the sensor transfer function is used to generate an inverse filter that when applied to the signals changes parameters of signals to correspond to the signals being generated by a seismic sensor having a reference transfer function, wherein the reference transfer function is associated with a known accuracy.

2. The system of claim 1, wherein the seismic data processing system is coupled to the system for acquiring and processing seismic data and is configured to:
   receive the signals formatted by the data extraction unit;
   identify the seismic sensor coupled to the seismic data acquisition unit that generated the signals;
   retrieve the sensor transfer function that corresponds to the seismic sensor;
   generate, based on the sensor transfer function and the reference transfer function, the inverse filter; and
   apply the inverse filter to the signals.

3. The system of claim 2, wherein the seismic data processing system is configured to generate the reference transfer function as an average of sensor transfer functions of a plurality of seismic sensors.

4. The system of claim 1, wherein the test signal comprises an impulse or a plurality of frequencies applied to move the seismic sensor.

5. The system of claim 1, wherein the sensor tester is configured to:
   compare the sensor transfer function of the sensor generated as part of a manufacturing test to the sensor transfer function of the sensor generated as part of the field test;
   generate an alert signal based on a dissimilarity between the sensor transfer function of the sensor generated as part of the manufacturing test to the sensor transfer function of the sensor generated as part of the field test exceeding a predetermined amount.

6. The system of claim 1, wherein the sensor comprises at least one of a piezoelectric crystal, a geophone, and an accelerometer.

7. The system of claim 6, wherein the data extraction unit is configured to:
   retrieve the sensor transfer function from the data storage memory; and
   format the sensor transfer function for transport to the seismic data processing system in conjunction with the signals.

8. A method for processing seismic data performed by a seismic data system, comprising:
   receiving signals representing seismic data recorded at a remote location;
   receiving, in conjunction with the signals, identification of a seismic sensor via which the signals were acquired;
   retrieving a sensor transfer function that corresponds to the seismic sensor, wherein the sensor transfer function indicates a response of the seismic sensor to a test signal having a predetermined wave shape, and wherein the response is based on a motion of the seismic sensor responsive to the test signal;
   generating based on the sensor transfer function and a reference transfer function, an inverse filter that when applied to the signals changes parameters of the signals to correspond to signals generated by a seismic sensor having the reference transfer function; and
   applying the inverse filter to the signals to conform the parameters of the signals to the reference transfer function.

9. The method of claim 8, further comprising:
   storing the sensor transfer function in a data storage memory of a seismic data acquisition unit coupled to the seismic sensor prior to deployment of the seismic data acquisition unit;
   after use of the seismic data acquisition unit to record seismic data:
      retrieving the signals stored in a data storage memory of the seismic data acquisition unit; and
      formatting the signals for transport to a remote data processing system.

10. The method of claim 8, further comprising:
   applying, using an impulse generation device, a test signal to the seismic sensor, as part of a manufacturing test or a field test, wherein the test signal comprises at least one of an impulse or a range of frequencies applied to move the seismic sensor;
   recording the response of the seismic sensor to the test signal;
   storing the sensor transfer function for use by the remote data processing system in generating the inverse filter.

11. The method of claim 10, further comprising:
   comparing the sensor transfer function of the seismic sensor generated as part of the manufacturing test to the sensor transfer function of the seismic sensor generated as part of the field test; and
   generating an alert signal based on a dissimilarity between the transfer function of the seismic sensor generated as part of the manufacturing test to the sensor transfer function of the seismic sensor generated as part of the field test exceeding a predetermined amount.

12. The method of claim 8, further comprising generating the reference transfer function as an average of sensor transfer functions of a plurality of seismic sensors.

13. The method of claim 8, further comprising:
retrieving, from a transfer function memory of a seismic data acquisition unit, the sensor transfer function; and
formatting the sensor transfer function for transport to the remote data processing system in conjunction with the signals.

14. A method for processing seismic data, comprising:
as part of manufacturing test of a seismic sensor to be used for acquisition of seismic data:
applying, using an impulse generation device, a test signal having a predetermined wave shape to the seismic sensor as part of a field test;
recording a response of the seismic sensor to the test signal based on a motion of the seismic sensor responsive to the test signal;
determining a sensor transfer function of the seismic sensor, wherein the sensor transfer function indicates the response of the seismic sensor to the test signal having the predetermined wave shape;
storing the sensor transfer function for use by a seismic data processing system in generation of an inverse filter;
as part of seismic data acquisition:
acquiring seismic data via the seismic sensor;
extracting the seismic data from a seismic data acquisition unit coupled to the seismic sensor;
formatting the seismic data for transport to the seismic data processing system that is at a different location from the seismic data acquisition unit by providing identification of the seismic sensor for transport with the seismic data;
as part of processing of the seismic data by the seismic data processing system:
retrieving the sensor transfer function based on the identification of the seismic sensor;
generating, based on the sensor transfer function and a reference transfer function, the inverse filter that when applied to the seismic data changes parameters of the seismic data to correspond to the seismic data being generated by a seismic sensor having the reference transfer function, wherein the reference transfer function is associated with a known accuracy;
applying the inverse filter to the seismic data to conform the parameters of the seismic data to the seismic data being generated with the seismic sensor having the reference transfer function.

15. The method of claim 14, wherein storing the sensor transfer function comprises storing the sensor transfer function in a data storage memory of the seismic data acquisition unit coupled to the seismic sensor or storing the sensor transfer function in a database accessible to the seismic data processing system.

16. The method of claim 14, wherein deriving the sensor transfer function comprises:
processing the response to generate the transfer function; and
storing the sensor transfer function for use by the seismic data processing system in generating the inverse filter.

17. The method of claim 16, wherein applying the test signal comprises:
affixing the seismic sensor to a movable structure; and
applying a motion impulse or motion over a range of frequencies to the movable structure.

18. The method of claim 14, further comprising:
as part of seismic data acquisition:
retrieving, from a transfer function memory of a seismic data acquisition unit, the sensor transfer function; and
formatting the sensor transfer function for transport to the data processing system in conjunction with the seismic data; or
as part of the seismic data acquisition:
comparing the sensor transfer function of the sensor generated as part of the manufacturing test to the sensor transfer function of the sensor generated as part of a field test;
generating an alert signal based on a dissimilarity between the sensor transfer function of the sensor generated as part of the manufacturing test to the sensor transfer function of the sensor generated as part of the field test exceeding a predetermined amount.

19. The method of claim 14, further comprising, as part of processing of the seismic data by the seismic data processing system, generating the reference transfer function as an average of sensor transfer functions of a plurality of movable sensors.

* * * * *